US011751511B2

(12) United States Patent
Smith et al.

(10) Patent No.: US 11,751,511 B2
(45) Date of Patent: Sep. 12, 2023

(54) BALE FORMING CONTROL SYSTEM AND METHOD

(71) Applicant: CNH Industrial America LLC, New Holland, PA (US)

(72) Inventors: Kevin M. Smith, Narvon, PA (US); John D. Gardus, Allentown, PA (US); John Posselius, Ephrata, PA (US); Jan C. Van Groenigen, Varsenare (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/780,473

(22) Filed: Feb. 3, 2020

(65) Prior Publication Data

US 2020/0229351 A1    Jul. 23, 2020

Related U.S. Application Data

(63) Continuation of application No. 14/214,403, filed on Mar. 14, 2014, now abandoned.

(60) Provisional application No. 61/798,441, filed on Mar. 15, 2013.

(51) Int. Cl.
*A01F 15/08* (2006.01)
*A01F 15/10* (2006.01)

(52) U.S. Cl.
CPC ........ *A01F 15/0833* (2013.01); *A01F 15/106* (2013.01)

(58) Field of Classification Search
CPC .......................... A01F 15/0833; A01F 15/106
See application file for complete search history.

(56) References Cited

U.S. PATENT DOCUMENTS

| 2,576,784 A | 11/1951 | Dodds et al. |
| 3,022,622 A | 2/1962 | Nolt |
| 3,525,302 A | 8/1970 | Eberly et al. |
| 3,901,007 A | 8/1975 | Blanshine et al. |
| 4,132,164 A | 1/1979 | White |
| 4,611,535 A | 9/1986 | Anstey et al. |
| 5,622,104 A | 4/1997 | Viesselmann et al. |

(Continued)

FOREIGN PATENT DOCUMENTS

| DE | 102005029405 | | 1/2007 | |
| DE | 102005029405 A1 | * | 1/2007 | ........... A01B 61/025 |
| EP | 150631 | | 7/1985 | |

OTHER PUBLICATIONS

What is power take-off (PTO)_—Definition from WhatIs.com, retrieved date Mar. 15, 2021.*

(Continued)

*Primary Examiner* — Matthew Katcoff
*Assistant Examiner* — Mohammed S. Alawadi
(74) *Attorney, Agent, or Firm* — Peter Zacharias (57) ABSTRACT

A method of controlling formation of a bale includes: forming a bale from crop material by rotating the bale in a bale chamber; receiving with a controller of a control system at least one operating condition value corresponding to at least one operating condition sensed by a sensor when the bale is forming; automatically determining with the controller a power take-off speed of a drive mechanism responsive to receiving the at least one received operating condition value; and applying with the control system the determined power take-off speed to the drive mechanism.

16 Claims, 4 Drawing Sheets

(56) References Cited

U.S. PATENT DOCUMENTS

| | | |
|---|---|---|
| 5,768,872 A | 6/1998 | Von Allworden |
| 6,079,324 A | 6/2000 | Feraboli et al. |
| 6,272,825 B1 | 8/2001 | Anderson et al. |
| 6,530,311 B1 * | 3/2003 | Wilkens .............. A01F 15/0833 100/40 |
| 6,546,705 B2 | 4/2003 | Scarlett et al. |
| 6,651,416 B2 | 11/2003 | Trelstad et al. |
| 6,874,304 B2 | 4/2005 | Clauss |
| 6,915,736 B2 | 7/2005 | Leupe et al. |
| 6,975,911 B2 | 12/2005 | Stamps et al. |
| 7,085,625 B2 | 8/2006 | Stamps et al. |
| 7,104,191 B1 | 9/2006 | Parker et al. |
| 7,340,996 B1 | 3/2008 | Viaud |
| 7,681,382 B2 | 3/2010 | Viaud |
| 7,703,391 B2 | 4/2010 | Duenwald et al. |
| 2002/0011061 A1 | 1/2002 | Lucand et al. |
| 2004/0002368 A1 | 1/2004 | Shinners et al. |
| 2004/0083704 A1 | 5/2004 | Lucand et al. |
| 2008/0148703 A1 | 6/2008 | Smith et al. |
| 2009/0217827 A1 * | 9/2009 | Duenwald .......... A01F 15/0833 100/88 |
| 2011/0023441 A1 * | 2/2011 | Herron .................. A01D 43/06 56/341 |
| 2011/0023732 A1 * | 2/2011 | Herron .................. A01F 15/08 100/40 |
| 2011/0060507 A1 | 3/2011 | Vanhercke et al. |
| 2012/0310491 A1 | 12/2012 | Vermeulen |
| 2014/0373737 A1 | 12/2014 | Dlander et al. |

OTHER PUBLICATIONS

English translate (DE102005029405A1), Retrieved date May 9, 2022.*

* cited by examiner

BALE FORMING CONTROL SYSTEM AND METHOD

CROSS REFERENCE TO RELATED APPLICATIONS

This is a continuation of U.S. patent application Ser. No. 14/214,403, entitled "BALE FORMING CONTROL SYSTEM AND METHOD," filed Mar. 14, 2014, which is incorporated herein by reference. U.S. patent application Ser. No. 14/214,403 is a non-provisional application based upon U.S. Provisional Patent Application Ser. No. 61/798,441, entitled "BALE FORMING CONTROL SYSTEM AND METHOD," filed Mar. 15, 2013, which is incorporated herein by reference.

TECHNOLOGY FIELD

The present disclosure relates generally to automatically controlling the formation of a bale in a baler based on sensed parameters, and particularly to automatically determining the density pressure applied to the bale and the speed of the bale chamber via a power take-off (PTO) speed based on sensed parameters.

BACKGROUND

Agricultural balers have been used to consolidate and package crop material to facilitate the storage and handling of the crop material for later use. Typically, a mower-conditioner cuts and conditions the crop material for windrow drying in the sun. When the cut crop material is properly dried, a baler, for example a round baler, the most frequently used in industry, is pulled by a tractor and travels along the windrows to pick up the crop material and form the material into cylindrically-shaped round bales.

More specifically, the cut crop material is gathered at the front of the baler from along the ground, onto a pickup assembly, and introduced into a bale-forming chamber within the baler. Inside the cut crop is rolled up into a predetermined size. A conventional bale chamber may include a series of belts, chains, and/or rolls that rotate and compress the crop material into the cylindrically-shaped round bale. When the predetermined size is achieved, the cylindrically-shaped round bale is wrapped and bound by net wrapping or other wrapping such as plastic wrapping and wire. After the round bale is wrapped, the back of the baler, or tailgate assembly, opens and the wrapped bale is discharged.

Each time the bale is rotated in the bale chamber, the bale is compressed creating a higher bale density and providing for more crop material to be formed in the bale. A higher number of revolutions of the bale in the bale chamber, however, increases the amount of power needed and, consequently, increases the amount of fuel consumption. Further, each time the bale rotates, the bale may be damaged by components (e.g., rolls and belts) and crop material may fall out of the baler chamber. An improved method of controlling formation of a bale in a bale chamber is needed.

SUMMARY OF THE INVENTION

Embodiments provide a method of controlling formation of a bale with a control system of an agricultural harvester. The method includes: rotating a bale of crop material in a bale chamber; applying bale density pressure to the rotating bale; receiving from a sensor at least one operating condition value corresponding to at least one sensed operating condition when the bale is forming; automatically determining with the control system an amount of bale density pressure to be applied to the bale to achieve a desired density of the bale responsive to receiving the at least one received operating condition value; applying through the control system the determined amount of bale density pressure; automatically determining a power take-off speed of a drive mechanism responsive to receiving the at least one received operating condition value; and applying the determined power take-off speed to the drive mechanism.

According to an embodiment, the method includes comprising applying a bale chamber speed that is fixed relative to the PTO speed.

In an aspect of an embodiment, the method includes varying the PTO speed relative to a crop pickup speed while the bale chamber speed remains fixed relative to the PTO speed.

In another embodiment, receiving at least one operating condition value further comprises receiving at least one operating condition value corresponding to at least one sensed operating condition from a group of sensed operating conditions comprising: a bale size; a bale weight; a rate of change of bale size; a rate of change of bale weight; a bale moisture content; a rate of incoming crop flow; an amount of PTO torque; a rate of fuel consumption; and a bale density.

Embodiments provide a bale forming control system that includes: a bale chamber configured to form a bale from crop material by rotating the bale in the bale chamber; a driving mechanism configured to cause the bale to be rotated in the bale chamber; a bale density pressure mechanism configured to apply density pressure to the rotating bale; at least one sensor configured to sense at least one operating condition when the bale is forming; and a controller. The controller is configured to: receive at least one operating condition value corresponding to the at least one sensed operating condition and control formation of the bale; automatically determine a power take-off speed of the driving mechanism responsive to receiving the at least one received operating condition value; and cause the determined power take-off speed to be applied to the driving mechanism.

In an embodiment, the controller is further configured to apply a bale chamber speed that is fixed relative to the PTO speed.

According to an aspect of an embodiment, the system also includes a feeder mechanism configured to pick up crop and feed the crop to the bale chamber. The controller (302) is further configured to vary the PTO speed relative to a crop pickup speed of the feeder mechanism while the bale chamber speed remains fixed relative to the PTO speed.

In another embodiment, the at least one sensor is configured to sense at least one operating condition from a group of operating conditions comprising: a bale size; a bale weight; a rate of change of bale size; a rate of change of bale weight; a bale moisture content; a rate of incoming crop flow; an amount of PTO torque; a rate of fuel consumption; and a bale density.

Embodiments provide a method of controlling formation of a bale. The method includes: forming a bale from crop material by rotating the bale in a bale chamber; receiving with a controller of a control system at least one operating condition value corresponding to at least one operating condition sensed by a sensor when the bale is forming; automatically determining with the controller a power take-off speed of a drive mechanism responsive to receiving the at least one received operating condition value; and applying with the control system the determined power take-off speed to the drive mechanism.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIGS. 2A and 2B depict side views of a round baler with a bale rotating at different bale chamber speeds.

DETAILED DESCRIPTION OF ILLUSTRATIVE EMBODIMENTS

The number of rotations needed to form a bale of a desired density may be controlled by tractor PTO speed and bale density pressure. Conventional methods and systems for forming bales manually set the PTO speed and bale density pressure prior to the operation of the formation of the bale. Operating conditions that may change during the formation of the bale, however, may affect the number of rotations needed to form a bale of a desired density. These operating conditions may include, but are not limited to, bale size; bale weight; rate of change of bale size; rate of change of bale weight; bale moisture content; rate of incoming crop flow; amount of PTO torque; and rate of fuel consumption.

Embodiments of the present invention provide an improved system and method of controlling formation of a bale. Embodiments of the present invention minimize the number of bale rotations while still maintaining a desired bale density. Embodiments of the present invention utilize sensors to automatically sense one or more baler conditions during operation and determine at least one of tractor PTO speed and baler hydraulic bale density pressure based on the one or more sensed baler conditions. Embodiments of the present invention automatically sense one or more baler conditions that include bale size, bale weight, rate of change of bale size and rate of change of bale weight, bale moisture content, volume of incoming crop, PTO Torque, tractor fuel usage and bale density.

Embodiments provide a method of controlling formation of a bale that includes forming a bale from crop material by: rotating the bale in a bale chamber and applying an amount of density pressure to the rotating bale. The method also includes receiving at least one operating condition value corresponding to at least one sensed operating condition when the bale is forming. The method further includes automatically determining the amount of bale density pressure applied to the bale responsive to receiving the at least one received operating condition value and controlling formation of the bale by adjusting the amount of bale density pressure to be applied to the bale relative to the previously determined amount of bale density pressure being applied. In some embodiments, the invention relates to a method of controlling formation of a bale comprising: rotating crop material in a bale chamber and applying an amount of density pressure to the rotating bale; determining one or more conditions of agricultural harvester operation selected from: bale size, bale weight, rate of change of bale size and rate of change of bale weight, bale moisture content, volume of incoming crop, PTO Torque, tractor fuel usage, pressure applied to the bale during rotation; and adjusting the amount of density pressure to the rotating bale such that the adjustment forms the bale with an equal or substantially equal bale density relative to bale density before the adjustment during one or a plurality of operational conditions. In some embodiments, the invention relates to a method of controlling formation of a bale comprising: rotating crop material in a bale chamber and applying an amount of density pressure to the rotating bale; determining one or more operating condition values corresponding to one or more operating conditions of an agricultural harvester selected from: bale size, bale weight, rate of change of bale size and rate of change of bale weight, bale moisture content, volume of incoming crop, PTO Torque, tractor fuel usage, pressure applied to the bale during rotation; and adjusting PTO speed of the driving mechanism responsive to receiving the at least one received operating condition value such that the adjustment f of PTO speed forms the bale with an equal or substantially equal bale density relative to bale density before the adjustment during one or a plurality of operational conditions of the agricultural harvester. In some embodiments, any of the methods disclosed herein comprising the steps of determining one or more operating condition values corresponding to one or more operating conditions of an agricultural harvester and adjusting PTO speed or the amount of density pressure to the rotating bale are performed by one or a series of controllers operably linked to one or more sensors. In some embodiments, wherein the one or more controllers are configured to: (i) automatically determine a PTO speed of the driving mechanism responsive to receiving the at least one received operating condition value; and (ii) cause the determined PTO speed to be applied to the driving mechanism.

Embodiments of the present invention are particularly well suited for, but in no way limited to, use with agricultural harvesters and agricultural balers, for example, such as round balers. In some embodiments, the present invention is configured for inclusion in combines, cotton harvesters, waste balers, or round balers comprising a bale chamber adapted for rotation and formation of a bale. Agricultural balers, such as round balers, are well known in the agricultural industry, and the instant invention can be used with substantially any of such machines.

Figure 1:
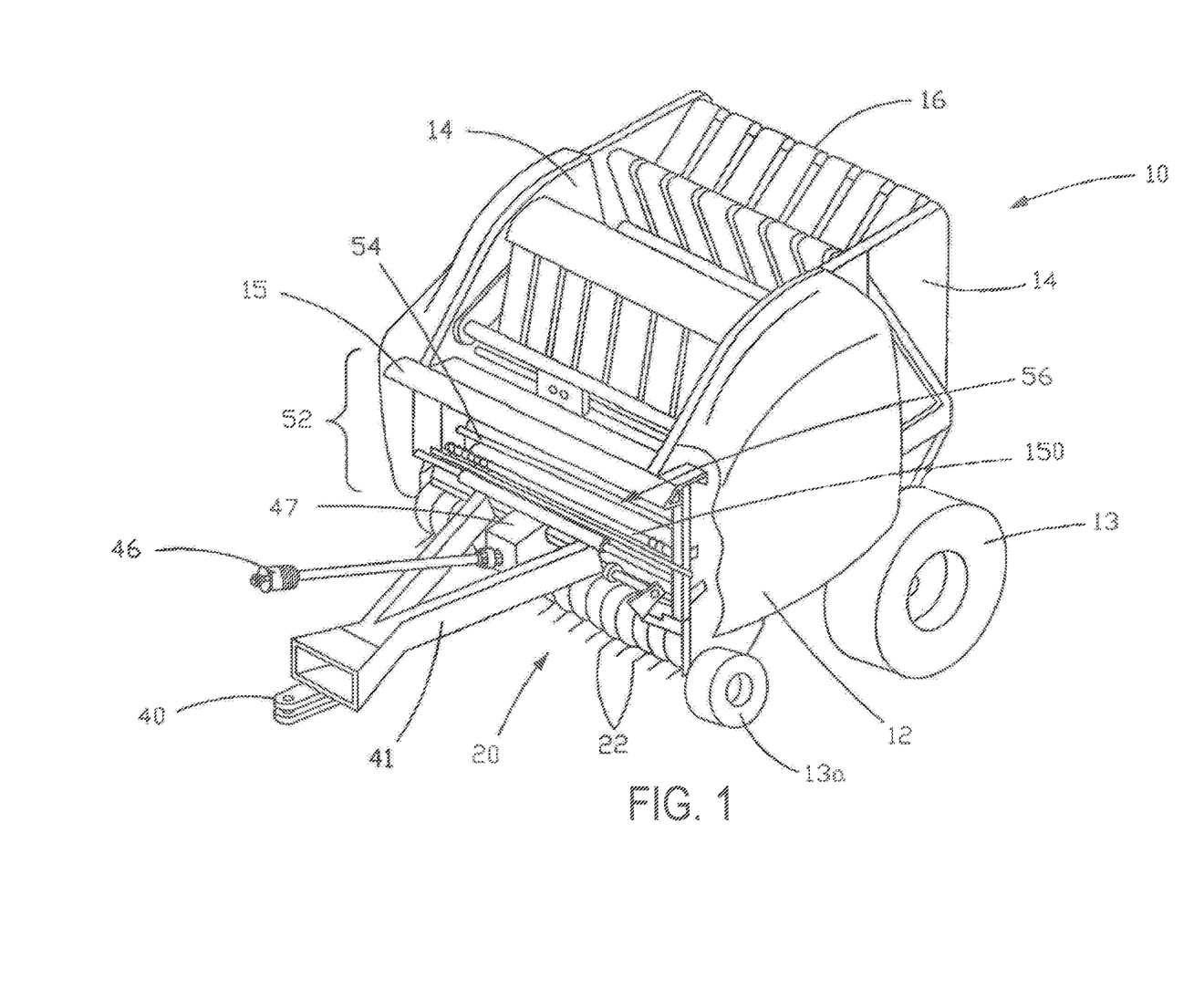
FIG. 1 illustrates an exemplary round baler for use with embodiments of the present invention.

FIG. 1 illustrates an exemplary round baler for use with embodiments of the present invention. As shown in FIG. 1, round baler 10 is enclosed by a main frame 12, comprising a plurality of rigid structural elements including a pair of side walls 14. Main frame 12 is supported by a pair of rear wheels 13. A forwardly mounted hitch 40, integrated with the main frame 12, provides for connection to a tractor (not shown). As shown, a power take off (PTO) shaft 46, is located herein above the hitch 40. In other balers, the PTO shaft may be located and connected to the tractor below the hitch. The PTO shaft draws energy from a tractor driving the hitch and transfers that energy to drive mechanisms in the baler 10. Rear side 16, typically comprises a tailgate which is closed during baling and opened to eject finished bales. In conventional balers, storage to house spare net rolls is typically located about the tailgate.

Also shown in FIG. 1 is the front side 15 of the baler. This side faces the rear of a tractor (not shown) as connected to by the hitch 40 and PTO shaft 46. At the bottom of the front side, between a front pair of wheels 13a, and mounted to the mainframe 12, is the pickup 20. The pickup 20 is supported by the pair of front wheels 13a. Pickup tines 22 wrap around and connect within the pickup 20. The tips of the tines 22 are movable along a predetermined path along the ground to lift crop material from the ground and deliver it rearward along a generally horizontal path toward a floor roll (not shown) at the bottom of the baler, which is rotatably mounted on main frame 12. During baling, the floor roll conveys crop material further rear into a bale chamber where belts then urge the material upwardly and forwardly into engagement with sledge rolls. The sledge rolls coil crop material in a round direction to form and add to a bale core. Continued feeding by pickup tines 22 urge additional crop material into the forming bale in a generally spiral fashion growing the bale core.

Components of balers may operate at different speeds, affecting the formation of the bales in the bale chamber. These speeds may include PTO speed, bale chamber speed, pick up speed and travel speed. PTO speed is the speed of the PTO shaft 46 that draws energy from a tractor to drive mechanisms in the baler 10. Conventional balers and tractors operate at a fixed PTO speed. Part of the PTO drive train is coupled to the bale chamber. Another part of the PTO drive train is coupled to the pickup 20 of a feeding mechanism in the baler. The bale chamber speed is the rotational speed of the bale turning in the baler. The pickup speed is the speed of the pickup, (e.g., speed of a rotor feeder or stuffer controlling the rate of crop flowing into the bale chamber. The travel speed is the ground speed of the tractor and baler combination. Typically, the pickup speed and the ground speed together are adjusted with respect to each other. For example, as the travel speed increases, the pickup speed is also increased to collect or harvest the crop material. If an operator is driving an agricultural harvester comprising a bale chamber and a pickup at a slow rate of speed, the pickup may not need to operate as fast as when the operator is driving the agricultural harvester as a quick rate of speed. As the travel speed decreases, the pickup speed may also be adjusted (in this case, decreased) to collect or harvest the same volume of crop material into the bale chamber. In some embodiments, the adjustment of the speed of the pickup positively impacts the rate at which the density of the bale forms in the bale chamber during operational conditions. In some embodiments, the invention relates to a method of maintaining a constant density of a bale in a bale chamber during harvesting of crop material using any of the disclosed harvesters such as balers disclosed herein.

Figure 2A:
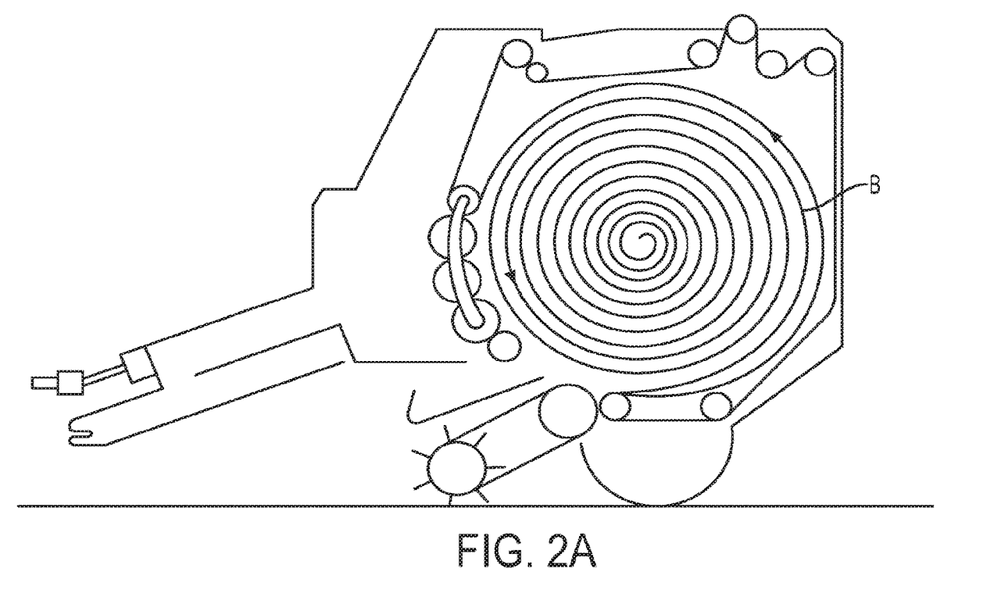
FIG. 2A depicts the baler operating with higher bale chamber speeds.
Figure 2B:
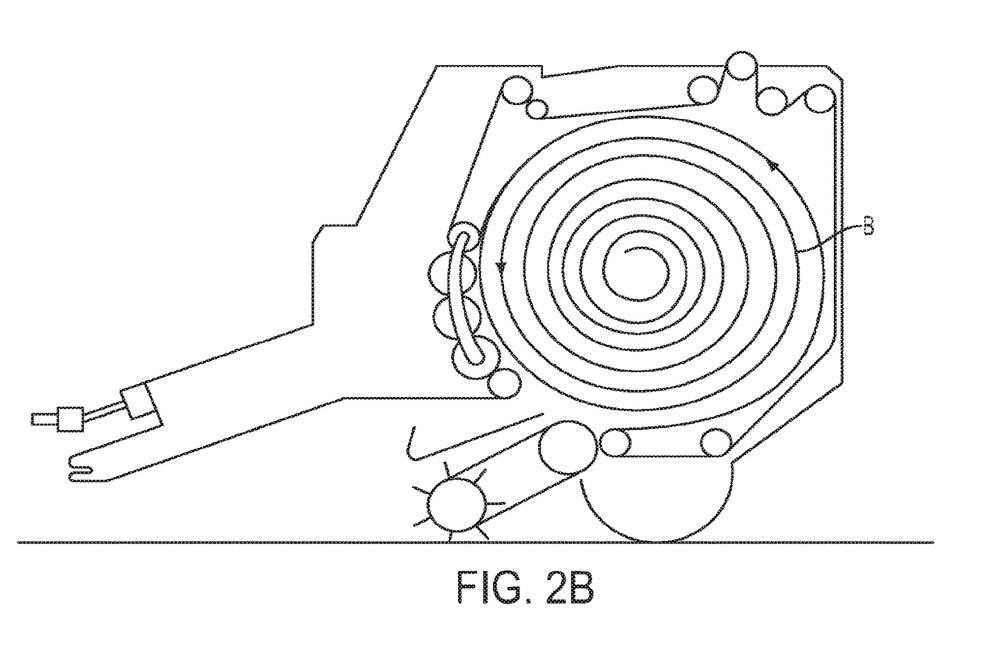
FIG. 2B depicts the baler operating with lower bale chamber speeds.

As described above, a higher number of revolutions of the bale in the bale chamber may increase fuel consumption, damage the bale and cause more crop material to fall out of the baler chamber. FIG. 2A and FIG. 2B illustrate bales formed from different number of rotations. The number of rotations needed to form a bale B of a desired density may be controlled by the bale density pressure and by bale chamber speed via the PTO speed. Conventional methods and systems for forming bales manually set the PTO speed and bale density pressure prior to the operation of the formation of the bale. Operating conditions that may change during the formation of the bale, however, may affect the number of rotations needed to form a bale of a desired density.

Figure 3:
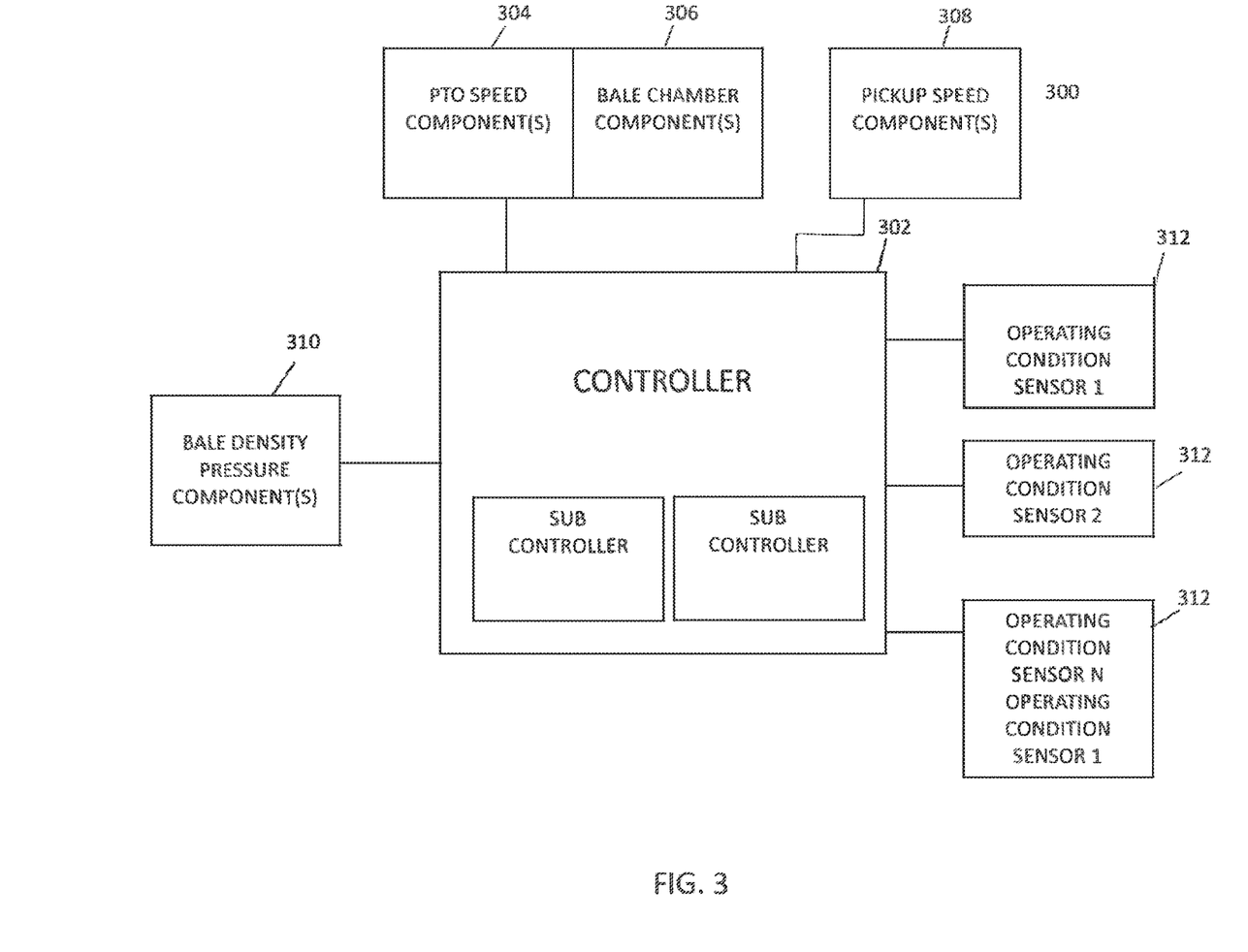
FIG. 3 is a block diagram illustrating a bale forming control system for use with embodiments of the present invention.

FIG. 3 is a block diagram illustrating a bale forming control system 300. As shown, control system 300 includes a controller 302. The controller 302 may include one or more controllers 302. In some embodiments, controller 302 may include a main controller and one or more sub controllers. In some aspects, sub controllers may be located in the tractor and baler respectively. In some aspects, separate components (e.g. bale density pressure mechanism, PTO drive shaft and pick up) may have respective sub controllers that receive instructions from the main controller.

Control system 300 may include a communication device (e.g. an ISOBUS) to provide communication between the tractor and baler to control the PTO speed, travel speed, pick up speed and bale chamber speed. In some aspects, the communication device may provide communication between the tractor and baler to automatically control the PTO speed while maintaining a certain ground speed of the baler.

As shown at FIG. 3, controller 302 may be coupled to one or more bale density pressure components 310 (e.g. hydraulic bale density pressure mechanism) configured to apply an amount of density pressure to the rotating bale. Controller 302 may be coupled to one or more PTO speed components 304 (e.g., a driving mechanism) configured to cause the bale B to be rotated in the bale chamber. For example, controller 302 may be coupled to the PTO drive shaft 46. The PTO drive shaft 46 may be coupled to bale chamber components 306 to cause the bale B to be rotated in the bale chamber at a bale chamber speed. Controller 302 may be configured to cause a bale chamber speed that is fixed relative to the PTO speed. Controller 302 may also be coupled to one or more pick up speed components 308 in a feeder mechanism configured to pick up crop and feed the crop to the bale chamber. For example, controller 302 may be coupled to pick up 20 and may be configured to vary the PTO speed relative to a crop pickup speed of the feeder mechanism while the bale chamber speed remains fixed relative to the PTO speed.

Figure 4:
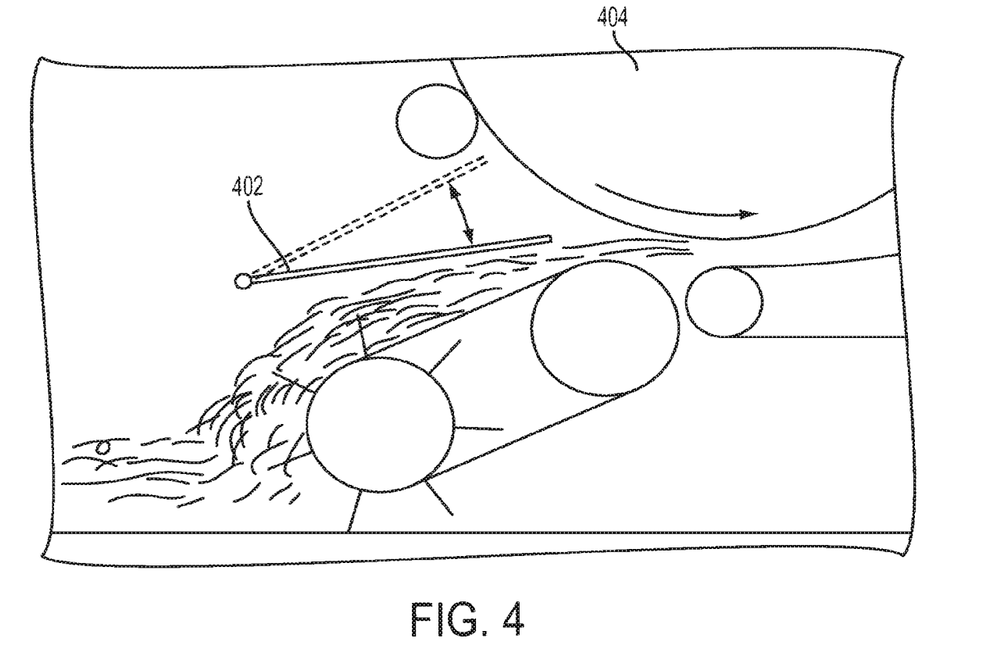
FIG. 4 is a side view of a portion of a baler illustrating different states of a windguard for use with embodiments of the present invention.

As shown at FIG. 3, controller 302 may also be coupled to one or more operating condition sensors 312 configured to sense at least one operating condition when the bale B is forming. The sensors 312 may located on or proximate to a respective component to sense at least one of a bale size; a bale weight; a rate of change of bale size; a rate of change of bale weight; a bale moisture content; a rate of incoming crop flow; an amount of PTO torque; a rate of fuel consumption; and a bale density. For example, FIG. 4 is a side view of a portion of a baler illustrating different states of a wind guard for use. One or more operating condition sensors 312 may be located on or proximate to wind guard 402 shown in FIG. 4 to sense the position of that wind guard 402 and the incoming crop flow into the bale chamber. The incoming crop flow into the bale chamber may be determined based on the sensed position of the wind guard 402 as it moves between the heavy crop position and light crop position shown at FIG. 4.

The controller 302 may be configured to: (i) receive at least one operating condition value corresponding to the at least one sensed operating condition and control formation of the bale B. In some embodiments, the controller 302 may be configured to automatically determine the amount of bale density pressure applied to the bale responsive to receiving the at least one received operating condition value and cause one or more bale density pressure components to apply the determined amount of bale density pressure to the bale. In some embodiments, the controller 302 may be configured to automatically determine a PTO speed of the driving mechanism responsive to receiving the at least one received operating condition value and cause the determined PTO speed to be applied to the driving mechanism. A bale chamber speed may then be fixed relative to the PTO speed. In some embodiments, the controller 302 may be configured to automatically determine both the bale density pressure and the PTO speed. The controller 302 may be configured to receive the at least one operating condition value upon request, at predetermined periodic intervals or when the condition value has a value change that is equal to or greater than a predetermined threshold value.

Embodiments may include a method of controlling formation of a bale. The method may include forming a bale B from crop material by rotating the bale B in a bale chamber, and applying an amount of density pressure to the rotating bale. The method may also include receiving at least one operating condition value corresponding to at least one sensed operating condition when the bale is forming. In some embodiments, the method may include receiving at least one operating condition value corresponding to at least one sensed operating condition from a group of sensed operating conditions that includes but is not limited to: a bale size; a bale weight; a rate of change of bale size; a rate of change of bale weight; a bale moisture content; a rate of incoming crop flow; an amount of PTO torque; a rate of fuel consumption; and a bale density.

In some embodiments, the method may include automatically determining the amount of bale density pressure applied to the bale responsive to receiving the at least one received operating condition value and controlling formation of the bale by causing the determined amount of bale density pressure to be applied to the bale. In some embodiments, the method may include automatically determining a PTO speed responsive to receiving the at least one received operating condition value and controlling formation of the bale by causing the determined PTO speed to be applied. In some embodiments, the method may include both automatically determining the amount of bale density pressure and automatically determining a PTO speed responsive to receiving the at least one received operating condition value. According to one embodiment, the method may include applying a bale chamber speed that is fixed relative to the PTO speed and varying the PTO speed relative to a crop pickup speed while the bale chamber speed remains fixed relative to the PTO speed.

For example, a density pressure may be determined to provide a bale having a desired density and the PTO speed that is fixed to the bale chamber speed may be determined to provide the bale having the desired density. The bale may then be rotated at a lower bale chamber speed to provide the bale having the desired density, causing the lower of number of rotations, reducing the power and fuel consumption and decreasing crop loss and damage to the bale.

In some embodiments, the tractor's PTO speed and bale chamber speed may be controlled to increase to provide a faster wrapping time during a net wrapping cycle. In these embodiments, it may be advantageous if the bale was rotating at a greater speed because a greater bale chamber speed may create a shorter net wrapping cycle. If there is little or no material being fed to the bale chamber, the PTO speed and bale chamber speed may be controlled to decrease and the wrapping cycle may be controlled to stop, minimizing power consumption and decreasing crop loss and damage to the bale.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A bale forming control system, comprising:
   a bale chamber configured to form a bale from crop material by rotating the bale in the bale chamber;
   a driving mechanism configured to cause the bale to be rotated in the bale chamber;
   a bale density pressure mechanism configured to apply density pressure to the rotating bale;
   at least one sensor configured to sense a bale moisture content when the bale is forming; and
   a controller configured to:
      receive a bale moisture content value corresponding to the bale moisture content and control formation of the bale;
      automatically determine a power take-off speed of the driving mechanism based on the received bale moisture content value; and
      cause the determined power take-off speed to be applied to the driving mechanism,
      wherein the power take-off speed is applied through a power take-off shaft, a rotational speed of which is the power take-off speed which is adjustable based at least in part on the received bale moisture content value, the power take-off shaft being configured for connecting to a vehicle and drawing energy from the vehicle and transferring that energy to the driving mechanism.

2. The bale forming control system of claim 1, wherein the controller is further configured to apply a bale chamber speed that is fixed relative to the power take-off speed.

3. The bale forming control system of claim 2, further comprising a feeder mechanism configured to pick up and feed the crop material to the bale chamber, and
   wherein the controller is further configured to vary the power take-off speed relative to a crop pickup speed of the feeder mechanism while the bale chamber speed remains fixed relative to the power take-off speed.

4. The bale forming control system of claim 3, wherein the controller is configured to cause the bale chamber speed to lower so the bale chamber speed remains fixed relative to the power take-off speed.

5. The bale forming control system of claim 1, in combination with an agricultural harvester wherein at least the bale chamber of the bale forming control system is supported by a frame of the agricultural harvester.

6. The bale forming control system of claim 5, in combination with the agricultural harvester, wherein the agricultural harvester is a round baler and the power take-off shaft is located adjacent a hitch of the round baler.

7. The bale forming control system of claim 5, in combination with the agricultural harvester, wherein the controller is further configured to cause a bale chamber speed to increase during a net wrapping cycle.

8. A method of controlling formation of a bale with a control system of an agricultural harvester, the method comprising:
rotating a bale of crop material in a bale chamber;
applying bale density pressure to the rotating bale;
receiving from a sensor a bale moisture content value corresponding to a bale moisture content when the bale is forming;
automatically determining with the control system an amount of bale density pressure to be applied to the bale to achieve a desired density of the bale responsive to receiving the bale moisture content value;
applying through the control system the determined amount of bale density pressure;
automatically determining a power take-off speed of a drive mechanism based on the received bale moisture content value; and
applying the determined power take-off speed to the drive mechanism, wherein the power take-off speed is applied through a power take-off shaft, a rotational speed of which is the power take-off speed which is adjustable based at least in part on the received bale moisture content value, the power take-off shaft being configured for connecting to a vehicle and drawing energy from the vehicle and transferring that energy to the driving mechanism.

9. The method of claim 8, further comprising applying a bale chamber speed that is fixed relative to the power take-off speed.

10. The method of claim 8, further comprising varying the power take-off speed relative to a crop pickup speed while the bale chamber speed remains fixed relative to the power take-off speed, the at least one operating condition being the bale moisture content.

11. The method of claim 8, further comprising increasing a bale chamber speed during a net wrapping cycle.

12. A method of controlling formation of a bale, the method comprising:
forming a bale from crop material by rotating the bale in a bale chamber;
receiving with a controller of a control system a bale moisture content value corresponding to a bale moisture content sensed by a sensor when the bale is forming;
automatically determining with the controller a power take-off speed of a drive mechanism based on the received bale moisture content value; and
applying with the control system the determined power take-off speed to the drive mechanism, wherein the power take-off speed is applied through a power take-off shaft, a rotational speed of which is the power take-off speed which is adjustable based at least in part on the received bale moisture content value, the power take-off shaft being configured for connecting to a vehicle and drawing energy from the vehicle and transferring that energy to the driving mechanism.

13. The method of claim 12, further comprising:
automatically determining with the controller an amount of bale density pressure to be applied to the bale to achieve the desired density responsive to receiving the received bale moisture content value; and
applying the determined amount of bale density pressure to the bale.

14. The method of claim 12, further comprising applying a bale chamber speed that is fixed relative to the power take-off speed.

15. The method of claim 12, further comprising varying the power take-off speed relative to a crop pickup speed while the bale chamber speed remains fixed relative to the power take-off speed.

16. The method of claim 12, further comprising increasing a bale chamber speed during a net wrapping cycle.

* * * * *